C. FERRARI.
ECCENTRIC SHIFTING MECHANISM FOR STEAM ENGINES.
APPLICATION FILED FEB. 2, 1911.
1,033,570.
Patented July 23, 1912.
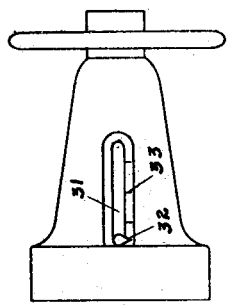
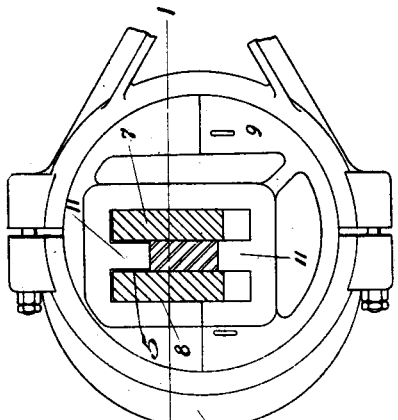
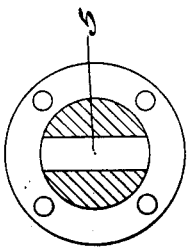
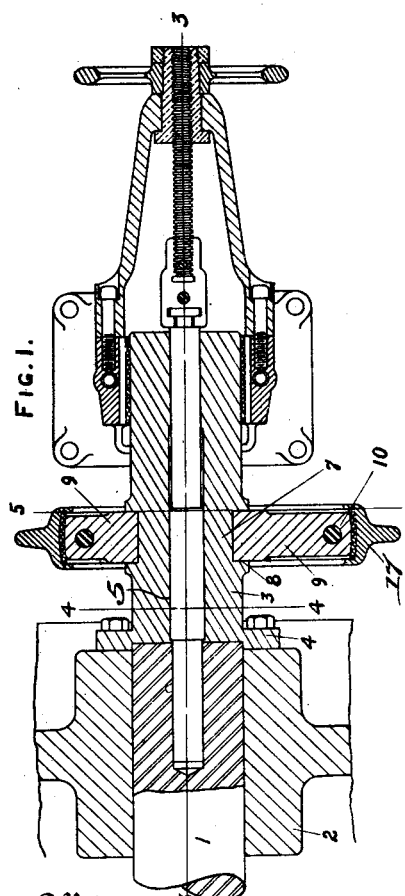
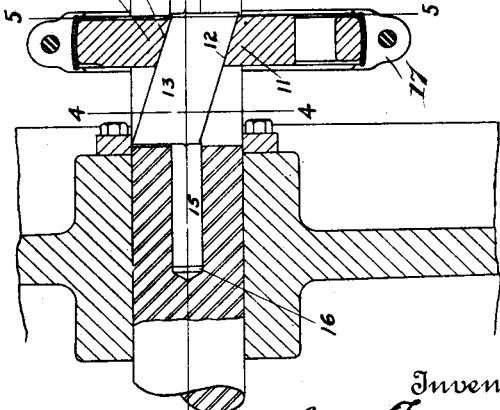

UNITED STATES PATENT OFFICE.

CARL FERRARI, OF ERIE, PENNSYLVANIA, ASSIGNOR TO ERIE CITY IRON WORKS, OF ERIE, PENNSYLVANIA, A CORPORATION OF PENNSYLVANIA.

ECCENTRIC-SHIFTING MECHANISM FOR STEAM-ENGINES.

1,033,570.    Specification of Letters Patent.    Patented July 23, 1912.

Application filed February 2, 1911. Serial No. 606,079.

*To all whom it may concern:*

Be it known that I, CARL FERRARI, a citizen of the United States, residing at Erie, in the county of Erie and State of Pennsylvania, have invented new and useful Improvements in Eccentric-Shifting Mechanism for Steam-Engines, of which the following is a specification.

This invention relates to eccentric shifting mechanism for steam engines, and consists in certain improvements in the construction thereof as will be hereinafter fully described and pointed out in the claims.

It is desirable with many classes of engines to be able to change the speed of the engine while running, and the object of this invention is to provide a simple and efficient means for accomplishing this result, by shifting the throw of the eccentric.

The invention is illustrated in the accompanying drawings as follows:

Figure 1 shows a section on the line 1—1 in Figs. 3 and 5. Fig. 2 is a plan view of the screw supporting frame with the index thereon. Fig. 3 a section on the line 3—3 in Fig. 1. Fig. 4 a section of the eccentric shaft on the line 4—4 in Figs. 1 and 3, the views being toward the hub of the wheel. Fig. 5 a section on the line 5—5 in Figs. 1 and 3.

1 marks the engine shaft, 2 the hub of the fly wheel and 3 the eccentric shaft.

The eccentric shaft has a ring on its periphery next to the hub, and this ring is bolted to the end of the hub, thus securing the shaft. The shaft has the longitudinal slot 5 which extends through the ring and out of the end of the shaft at the hub end and terminates in a bearing 18 on the opposite end. The bearing 18 is bored at 6. The shaft has a squared portion 7, on the sides of which are the guide grooves 8.

The eccentric 9 is slidingly mounted in the guide grooves 8, the eccentric being made in two parts so as to be mounted on the guide grooves 8 and the two parts are secured together by the blind screws 10. The eccentric has the cam projections 11 which extend into the longitudinal slot 5 in the shaft 3. These cam projections 11 have the cam surfaces 12, the cam projections on the opposing projections being parallel and on a slant to the axis of the shaft.

The cam 13 is arranged in the slot 5 and extends through the eccentric and between the cam projections 11. The cam is of the same slant as the surfaces 12 so that as this cam is moved in an axial direction in the slot, the eccentric is moved in a radial direction, thus varying the throw of the eccentric while maintaining its circumferential relation to the shaft. The cam is supported on the pins 14 and 15 which extend axially from the cam, the pin 14 being carried in the bore 6 and extending through said bore to the end of the shaft, and the pin 15 extending into the bore 16 in the end of the engine shaft.

The eccentric strap 17 is of ordinary construction, and is mounted on the eccentric.

The bearing end 18 of the shaft 3 is mounted in the bearing 19 carried by a post 20.

The end of the pin 14 has an annular groove which is engaged by a fitting 22, the end of the shaft outside of the groove 21 and the fitting 22 forming a swivel joint. A screw 23 is fixed in the fitting 22 by means of the pin 24. The screw extends through the nut 25 and is carried by a screw frame 26 extending from the side of the post 20. The nut 25 is locked against axial movement by the shoulders 27 and 28. A hand wheel 29 is fixed on the nut between the shoulder 28 and the end of the frame 26.

It will be readily seen that by turning the hand wheel 29, the nut 25 is rotated and this operating on the screw 23 (the screw being locked against rotation) moves the screw in an axial direction, and this carries with it the pin 14 and the cam 13, thus effecting a change in the throw of the eccentric. It also will be observed that this may be accomplished while the engine is running, as well as, when stationary.

The pin 24 has an extension 30 which extends through the slot 31 in the top of the frame 26. The pin has the index finger 32 at the top which in connection with the graduations 33 makes it possible to accurately adjust the cam to different positions. The extension 30 also locks the fitting 22 and screw 23 against rotation so that the rotation of the nut will be active on the screw in effecting an axial movement.

What I claim as new is:

1. In an eccentric shifting mechanism for steam engines, the combination of a shaft having a longitudinal slot therein; a guide on the shaft; an eccentric slidingly mounted on the guide and movable transversely of the axis of the shaft and having projections extending into the slot, said projections having cam ends; a cam arranged in the slot between said ends and operating upon said cams to move the eccentric; and mechanism for actuating the cam.

2. In an eccentric shifting mechanism for steam engines, the combination of an engine shaft having an axial bore in its end; an eccentric shaft carried by the engine shaft and having a longitudinal slot therein; a guide on the shaft; an eccentric slidingly mounted on the guide and movable transversely of the axis of the shaft; a cam arranged in the slot for moving the eccentric to vary its throw; a pin extending from the cam into the bore of the engine shaft; and mechanism for actuating the cam.

3. In an eccentric shifting mechanism for steam engines, the combination of a shaft having a longitudinal slot therein and an axial bore, said longitudinal slot extending to the end of the shaft; a guide on the shaft; an eccentric slidingly mounted on the guide and movable transversely of the axis of the shaft; a cam arranged in the slot and having a pin extending therefrom into the axial bore; and means for actuating the cam.

4. In an eccentric shifting mechanism for steam engines, the combination of a steam engine shaft having an axial bore in the end thereof; a hub thereon; an eccentric shaft secured to the hub and having a longitudinal slot therein and an axial bore in the end opposite the end secured to the hub; a guide on the shaft; an eccentric slidingly mounted on the guide and movable transversely of the axis of the shaft, and having cam projections extending into the longitudinal slot; a cam in the longitudinal slot, said cam having pins extending into the axial bores; and means for actuating the cam.

In testimony whereof I have hereunto set my hand in the presence of two subscribing witnesses.

CARL FERRARI.

Witnesses:
BLANCHE HARTMAN,
VINNIE C. HESS.